United States Patent
Vaysse

(10) Patent No.: US 6,765,425 B2
(45) Date of Patent: Jul. 20, 2004

(54) MOSGATE DEVICE DRIVER FOR SYNCHRONOUS RECTIFICATION OF A 3 PHASE SINUSOIDAL SOURCE

(75) Inventor: Bertrand Vaysse, Toulouse (FR)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 10/375,743

(22) Filed: Feb. 26, 2003

(65) Prior Publication Data

US 2003/0164726 A1 Sep. 4, 2003

Related U.S. Application Data

(60) Provisional application No. 60/361,415, filed on Mar. 1, 2002, and provisional application No. 60/395,970, filed on Jul. 12, 2002.

(51) Int. Cl.$^7$ ............................................. H03L 5/00
(52) U.S. Cl. ..................... 327/330; 327/343; 363/87; 363/125; 363/127
(58) Field of Search .................. 327/309, 330, 327/343, 423, 587; 363/37, 44, 68, 87, 125, 127, 129, 132

(56) References Cited

U.S. PATENT DOCUMENTS

| | | | | | |
|---|---|---|---|---|---|
| 4,841,426 A | * | 6/1989 | Hakala | ........................ | 363/37 |
| 6,038,152 A | * | 3/2000 | Baker | ........................ | 363/89 |
| 6,046,917 A | * | 4/2000 | Gibbs et al. | ................... | 363/69 |

\* cited by examiner

*Primary Examiner*—Kenneth B. Wells
(74) *Attorney, Agent, or Firm*—Ostrolenk, Faber, Gerb & Soffen, LLP

(57) ABSTRACT

A rectifying circuit and method to produce a DC output by rectifying a sinusoidal source having a plurality of output phase voltages and a plurality of phase-to-phase voltages, the rectifying circuit including a bridge circuit coupled to the output phase voltages, the bridge circuit having a plurality of switches; and a control circuit coupled to the output phase voltages and to the bridge circuit, the control circuit being configured to control the switches in accordance with respective absolute values of the phase-to-phase voltages; wherein the output phase voltages are rectified to produce the DC output. When the sinusoidal source is inductive, switch turn-off may be timed to provide synchronous rectification related to estimates of source periodicity.

25 Claims, 6 Drawing Sheets

MOSGATE DEVICE DRIVER FOR SYNCHRONOUS RECTIFICATION OF A 3 PHASE SINUSOIDAL SOURCE

RELATED APPLICATIONS

This application is based on and claims priority to U.S. Provisional Patent Application No. 60/361,415, filed Mar. 1, 2002, entitled MOSGATE DEVICE DRIVER FOR SYNCHRONOUS RECTIFICATION OF A 3 PHASE SINUSOIDAL SOURCE, and this application is based on and claims priority to U.S. Provisional Application No. 60/395,970, filed Jul. 12, 2002, entitled MOSGATE DEVICE DRIVER FOR SYNCHRONOUS RECTIFICATION OF A 3 PHASE SINUSOIDAL SOURCE, the contents of all of which are incorporated herein by reference.

FIELD OF THE INVENTION

The invention relates to a circuit to produce a direct current (DC) output from a 3-phase alternating current (AC) source, such as a circuit including a MOSgate driver to drive MOSgated devices in a rectifier circuit.

BACKGROUND OF THE INVENTION

It is believed that at least some power electronics applications, such as AC motor drive applications, automotive generator applications, and/or switching power supply applications, may include circuits to rectify a sinusoidal voltage source to produce a DC output. The rectifying of the sinusoidal source may be performed, for example, by a diode bridge or by a collection of active switch bridges including, for example, MOSgated devices, such as MOSFETs and IGBTs.

An active switch bridge, for example, a switch bridge employing MOSFETs and/or IGBTs, may be advantageous with respect to diode bridges, since the channel of a MOSFET and/or IGBT carries the electrical current, as opposed to the diode of the diode bridge. In this advantageous manner, active switch bridges employing MOSFETs and/or IGBTs may better reduce conduction losses.

However, to properly operate an active switch bridge employing MOSFETs and/or IGBTs, signals for the gate nodes of the MOSFETs and/or IGBTs should be generated at appropriate times relative to the sinusoidal voltage source.

Furthermore, if the sinusoidal source produces phase voltages with significant inductances, switching losses may result in operation of a bridge circuit, in which proper control signal timing is not provided. Therefore, it may be advantageous to detect more optimum time instants for the turn-on and turn-off of the gate nodes of the MOSFETs and/or IGBTs.

SUMMARY OF THE INVENTION

To overcome these and other disadvantages of prior art rectification circuits, an exemplary embodiment of the present invention provides a rectifying circuit and method to produce a DC output by rectifying a sinusoidal source having a plurality of output phase voltages and a plurality of phase-to-phase voltages, the rectifying circuit including a bridge circuit coupled to the output phase voltages, the bridge circuit having a plurality of switches; and a control circuit coupled to the output phase voltages and to the bridge circuit, the control circuit being configured to control the switches in accordance with respective absolute values of the phase-to-phase voltages; in which the output phase voltages are rectified to produce the DC output.

The absolute values of phase-to-phase voltages may be determined in accordance with the output phase voltages each phase-to-phase voltage representing the voltage across two of the output phase voltages.

By comparing the absolute values of the phase-to-phase voltages, an exemplary rectifying circuit according to the present invention may turn on and/or turn off the switches of the bridge circuit at appropriate times to properly rectify the sinusoidal source and produce the DC output. For example, the exemplary rectifying circuit according to the present invention may operate respective pairs of switches at appropriate times in accordance with the magnitudes of the output phase voltages and the relative magnitudes of the absolute values of the phase-to-phase voltages.

If the sinusoidal source includes significant inductance, rectification of the 3-phase sinusoidal AC source 125 may be improved by providing additional exemplary timing circuitry according to the present invention to better control the switches. In this manner, the control circuit may perform switch turn-off in diode mode (e.g., MOSFET switches) by keeping the switches turned off, and by estimating the period of the sinusoidal source. With the period information, the turn-off commutation times may be estimated, and a delay may be provided, so that turn-off of the switches occurs before the end of the sinusoidal period.

DETAILED DESCRIPTION

Figure 1:
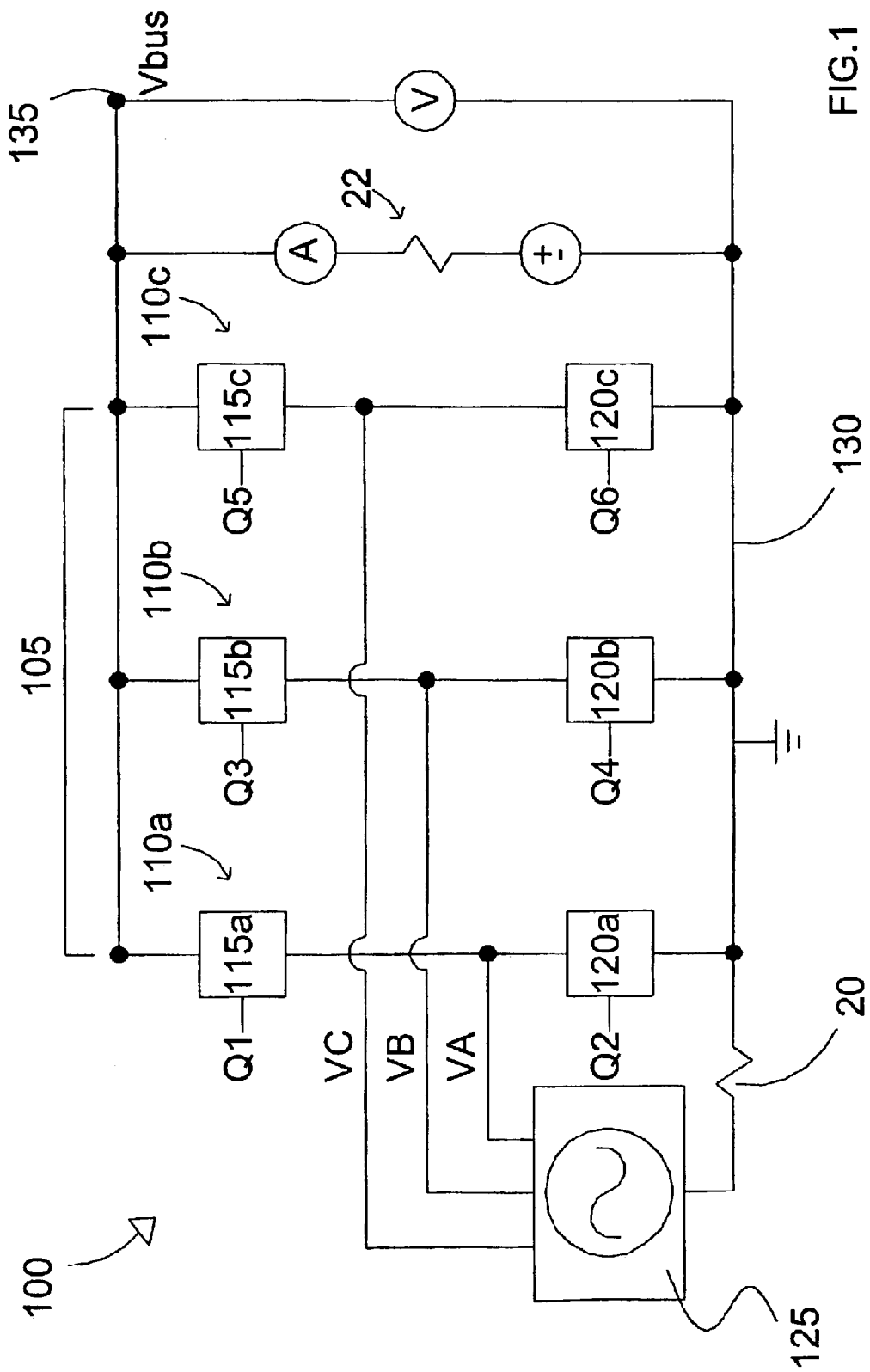
FIG. 1 illustrates a first exemplary rectifying circuit according to the present invention.

Referring now to FIG. 1, there is seen a first exemplary rectifying circuit 100 according to the present invention. Rectifying circuit 100 includes 3-phase bridge 105 of MOSgated devices (e.g., vertical conduction MOSFETs), the bridge including three legs 110*a*, 110*b*, 110*c*. Leg 110*a* includes MOSFETs 115*a*, 120*a*, leg 110*b* includes MOSFETs 115*b*, 120*b*, and leg 110*c* includes MOSFETs 115*c*, 120*c*. Rectifying circuit 100 also includes a 3-phase sinusoidal AC source 125, which produces source output phases $V_A$, $V_B$, $V_C$, which are electrically connected to respective nodes between MOSFETs 115*a*, 120*a*, MOSFETs 115*b*, 120*b*, and MOSFETs 115*c*, 120*c*, respectively. A DC output bus 135 is connected to the drains of MOSFETs 115*a*, 115*b*, 115*c*, and a return bus 130 is connected to the sources of MOSFETs 120*a*, 120*b*, 120*c*. A current sense resistor 22 is provided between the DC output bus 135 and the return bus 130.

Although FIG. 1 includes MOSFET switches, it should be appreciated that the MOSFETs 115*a*, 115*b*, 115*c*, 120*a*, 120*b*, 120*c* maybe replaced with any conventional circuit switches, such as, IGBTs, solid-state circuit switches, relays, transistor switching arrangements, etc.

In accordance with an exemplary embodiment of the present invention, gate signals (i.e., Q1, Q2, Q3, Q4, Q5, Q6) of MOSFETs 115a, 120a, 115b, 120b, 115c, 120c are controlled to rectify DC output bus 135 in a manner more fully described below.

Figure 2:
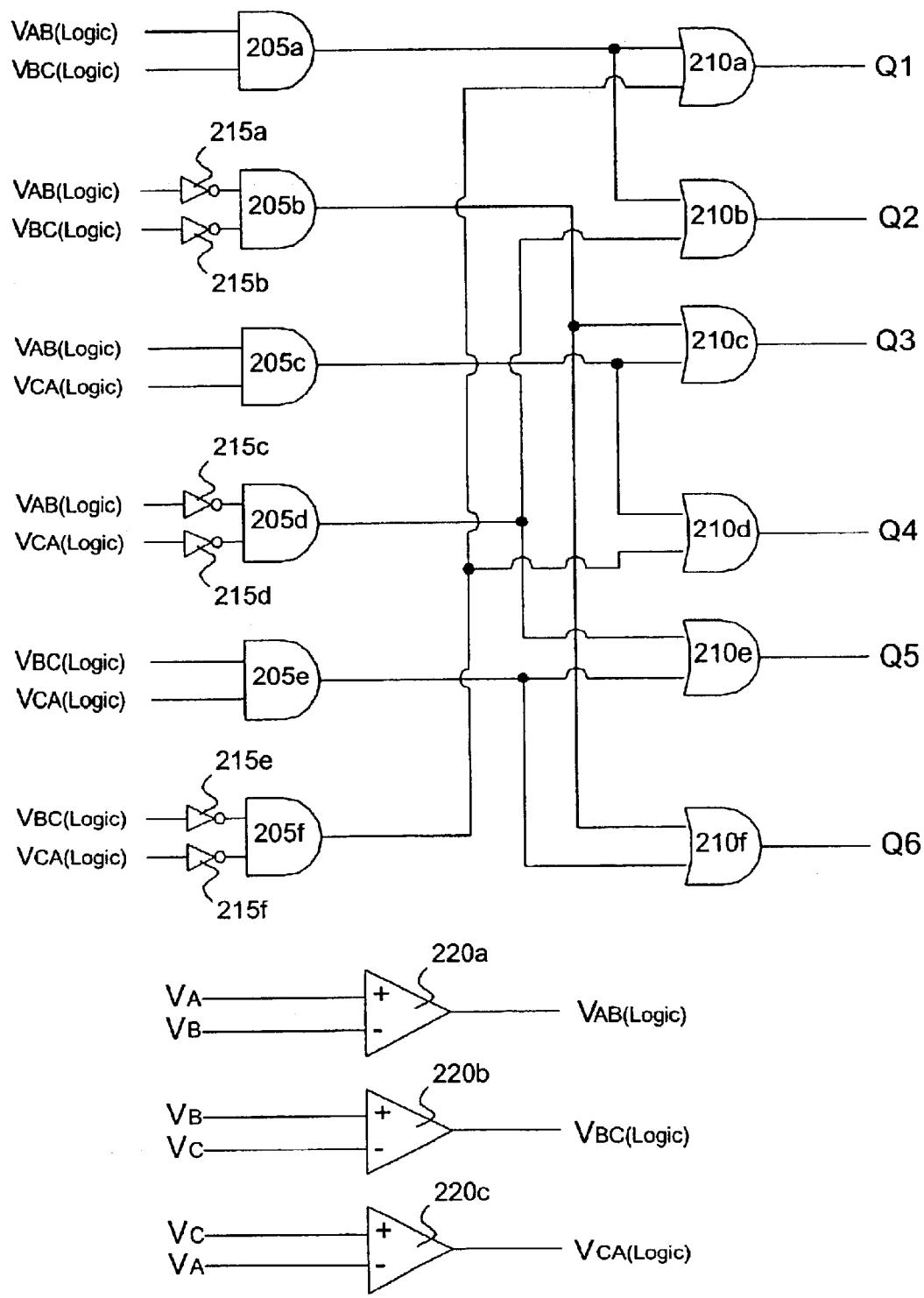
FIG. 2 illustrates a first exemplary control circuit according to the present invention.

Referring now to FIG. 2, there is seen an exemplary control circuit 200 according to the present invention for controlling gate signals Q1, Q2, Q3, Q4, Q5, Q6 of MOSFETs 115a, 120a, 115b, 120b, 115c, 120c, respectively. Control circuit 200 includes conventional logic elements and is operable to provide appropriate control signals over "slices" of one period of the 3-phase AC source 125, during which intervals the absolute value of one of the 3 phase-to-phase voltages (i.e., $V_{AB}$, $V_{BC}$, $V_{CA}$) is higher in magnitude than the absolute values of the other 2 phase-to-phase voltages. Control circuit 200 may be implemented, for example, in an integrated circuit, a driver ASIC, and/or a control ASIC. As shown in FIG. 2, control circuit 200 includes and-gates 205a, 205b, 205c, . . . , 205f, or-gates 210a, 210b, 210c, . . . , 210f, inverter-gates 215a, 215b, 215c, . . . , 215f, and comparators 220a, 220b, 220c, which produce logic signals $V_{AB(Logic)}$, $V_{BC(Logic)}$, $V_{CA(Logic)}$ in accordance with the 3 phase-to-phase voltages $V_{AB}$, $V_{BC}$, $V_{CA}$:

$$V_{AB}=V_A-V_B$$

$$V_{BC}=V_B-V_C$$

$$V_{CA}=V_C-V_A$$

The comparators 220a, 220b, 220c may produce, for example, logic signals $V_{AB(Logic)}$, $V_{BC(Logic)}$, $V_{CA(Logic)}$ corresponding to a high logic value (e.g., "1") when a respective phase-to-phase voltage is greater than 0 volts, and another electrical signal corresponding to a low logic value (e.g., "0") when a respective phase-to-phase voltage is less than 0 volts (e.g., "5" volts when the phase-to-phase voltage is greater than 0 volts, and "0" volts when the phase-to-phase voltage is less than 0 volts).

It is readily apparent that the absolute value of $V_{AB}$ is greater than the absolute values of $V_{BC}$ and $V_{CA}$ when $V_{BC}$ and $V_{CA}$ are both less than zero or both greater than zero (i.e., $V_{BC(Logic)}$="0" and $V_{CA(Logic)}$="0" or $V_{BC(Logic)}$="1" and $V_{CA(Logic)}$="1"); the absolute value of $V_{BC}$ is greater than the absolute values of $V_{AB}$ and $V_{CA}$ when $V_{AB}$ and $V_{CA}$ are both less than zero or both greater than zero (i.e., $V_{AB(Logic)}$="0" and $V_{CA(Logic)}$="0" or $V_{AB(Logic)}$="1" and $V_{CA(Logic)}$="1"); and the absolute value of $V_{CA}$ is greater than the absolute values of $V_{AB}$ and $V_{BC}$ when $V_{AB}$ and $V_{BC}$ are both less than zero or both greater than zero (i.e., $V_{AB(Logic)}$="0" and $V_{BC(Logic)}$="0" or $V_{AB(Logic)}$="1" and $V_{BC(Logic)}$="1").

When the absolute value of $V_{AB}$ is greater than the absolute values of $V_{BC}$ and $V_{CA}$ and the magnitude of $V_{AB}$ is greater than zero (i.e., when $V_{BC(Logic)}$="0" and $V_{CA(Logic)}$="0"), control circuit 200 operates to turn on gate signals Q1 and Q4, while switching off gate signals Q2, Q3, Q5, and Q6. When the absolute value of $V_{AB}$ is greater than the absolute values of $V_{BC}$ and $V_{CA}$ and the magnitude of $V_{AB}$ is less than zero (i.e., when $V_{BC(Logic)}$="1" and $V_{CA(Logic)}$="1"), control circuit 200 operates to turn on gate signals Q2 and Q3, while switching off gate signals Q1, Q4, Q5, and Q6. When the absolute value of $V_{BC}$ is greater than the absolute values of $V_{AB}$ and $V_{CA}$ and the magnitude of $V_{BC}$ is greater than zero (i.e., when $V_{AB(Logic)}$"0" and $V_{CA(Logic)}$="0"), control circuit 200 operates to turn on gate signals Q3 and Q6, while switching off gate signals Q1, Q2, Q4, and Q5. When the absolute value of $V_{BC}$ is greater than the absolute values of $V_{AB}$ and $V_{CA}$ and the magnitude of $V_{BC}$ is less than zero (i.e., when $V_{AB(Logic)}$="1" and $V_{CA(Logic)}$="1"), control circuit 200 operates to turn on gate signals Q4 and Q5, while switching off gate signals Q1, Q2, Q3, and Q6. When the absolute value of $V_{CA}$ is greater than the absolute values of $V_{AB}$ and $V_{BC}$, and the magnitude of $V_{CA}$ is greater than zero (i.e., when $V_{AB(Logic)}$="0" and $V_{BC(Logic)}$="0"), control circuit 200 operates to turn on gate signals Q2 and Q5, while switching off gate signals Q1, Q3, Q4, and Q6. When the absolute value of $V_{CA}$ is greater than the absolute values of $V_{AB}$ and $V_{BC}$, and the magnitude of $V_{CA}$ is less than zero (i.e., when $V_{AB(Logic)}$="1" and $V_{BC(Logic)}$="1"), control circuit 200 operates to turn on gate signals Q1 and Q6, while switching off gate signals Q2, Q3, Q4, and Q5.

The operation of control circuit 200 is represented in tabular format below:

| | Q1 | Q2 | Q3 | Q4 | Q5 | Q6 |
|---|---|---|---|---|---|---|
| $V_{BC(Logic)}$ = "0" $V_{CA(Logic)}$ = "0" | ON | OFF | OFF | ON | OFF | OFF |
| $V_{BC(Logic)}$ = "1" $V_{CA(Logic)}$ = "1" | OFF | ON | ON | OFF | OFF | OFF |
| $V_{CA(Logic)}$ = "0" $V_{AB(Logic)}$ = "0" | OFF | OFF | ON | OFF | OFF | ON |
| $V_{CA(Logic)}$ = "1" $V_{AB(Logic)}$ = "1" | OFF | OFF | OFF | ON | ON | OFF |
| $V_{AB(Logic)}$ = "0" $V_{BC(Logic)}$ = "0" | OFF | ON | OFF | OFF | ON | OFF |
| $V_{AB(Logic)}$ = "1" $V_{BC(Logic)}$ = "1" | ON | OFF | OFF | OFF | OFF | ON |

Figure 4:
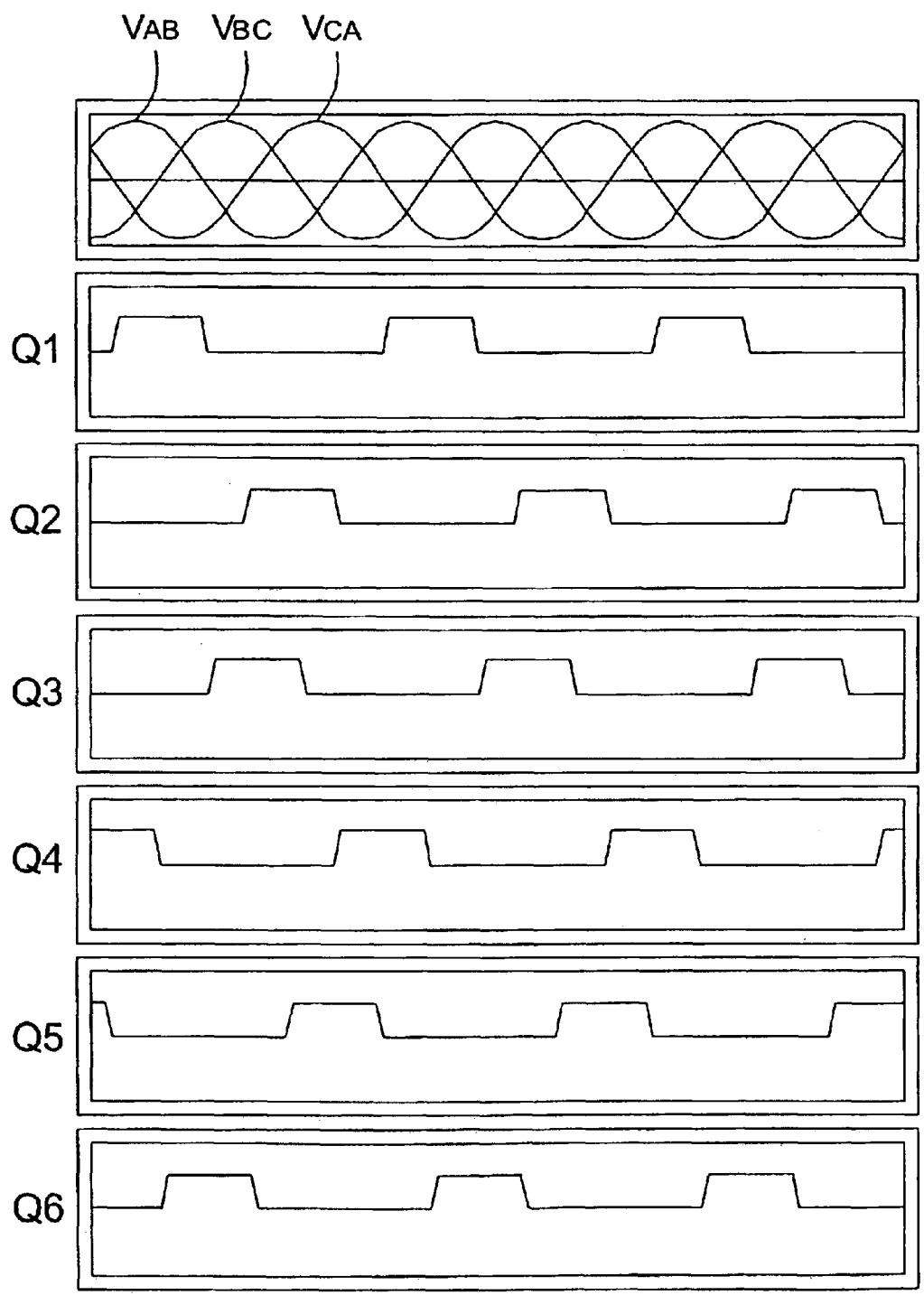
FIG. 4 is a graphical time diagram showing the control of gate MOSFET gate signals, in accordance with the control circuit of FIG. 2.

Referring now to FIG. 4, there is seen a graphical time diagram of gate signals Q1, Q2, Q3, Q4, Q5, and Q6, relative to $V_{AB}$, $V_{BC}$, and $V_{CA}$. For example, when the absolute value of $V_{AB}$ is greater than the absolute values of $V_{BC}$ and $V_{CA}$, and $V_{AB}$ is greater than zero, control circuit 200 operates to turn on gate signals Q1 and Q4, while switching off gate signals Q2, Q3, Q5, and Q6. In this manner, current will flow through MOSFETS 115a and 120b, thereby rectifying the 3-phase sinusoidal AC source 125.

Figure 3:
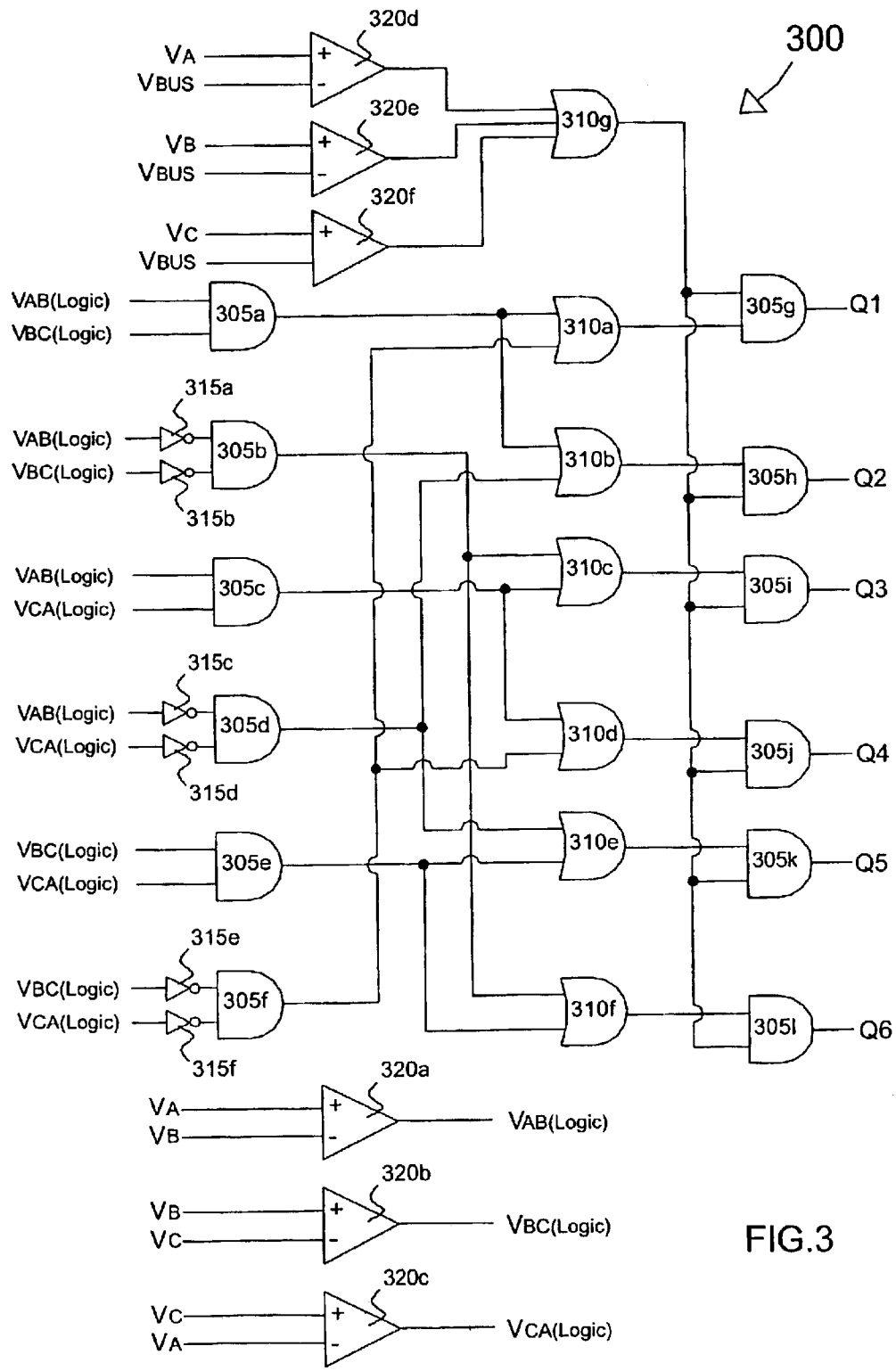
FIG. 3 illustrates a second exemplary control circuit according to the present invention.

Referring now to FIG. 3, there is seen another exemplary control circuit 300 according to the present invention for controlling gate signals Q1, Q2, Q3, Q4, Q5, Q6 of MOSFETs 115a, 120a, 115b, 120b, 115c, 120c. Control circuit 300 controls gate signals Q1, Q2, Q3, Q4, Q5, Q6 to rectify the 3-phase sinusoidal AC source 125 when $V_A$, $V_B$, or $V_C$ is greater than the DC output bus 135. In this manner, it may be better ensured that current does not flow backwards from the DC bus into the rectification circuit, which would disadvantageously cause the DC bus voltage to drop with respect to the sinusoidal source voltage. As shown in FIG. 3, control circuit 300 includes and-gates 305a, 305b, 305c, . . . , 305l, or-gates 310a, 310b, 310c, . . . , 310g, inverter-gates 315a, 315b, 315c, . . . , 315f, and comparators 320a, 320b, 320c, . . . , 320f.

Figure 5:
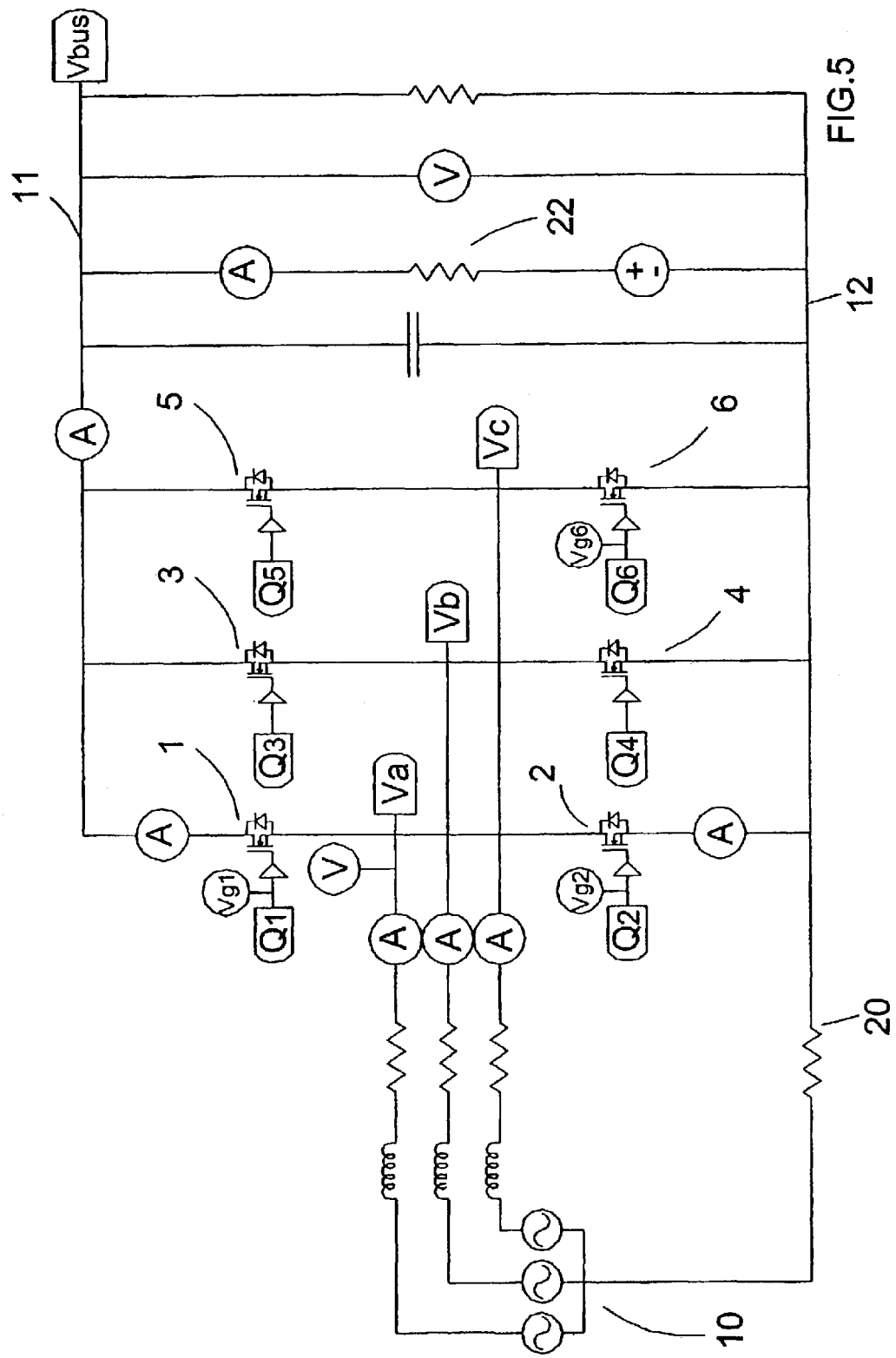
FIG. 5 illustrates a second exemplary rectifying circuit according to the present invention.

If the 3-phase sinusoidal AC source 125 has significant inductance, such as the 3-phase sinusoidal AC source illustrated in the rectifying circuit of FIG. 5, rectification of the 3-phase sinusoidal AC source 125 may be improved by providing additional timing circuitry to better control the gate signals Q1, Q2, Q3, Q4, Q5, Q6 of MOSFETs 115a, 120a, 115b, 120b, 115c, 120c.

Figure 6:
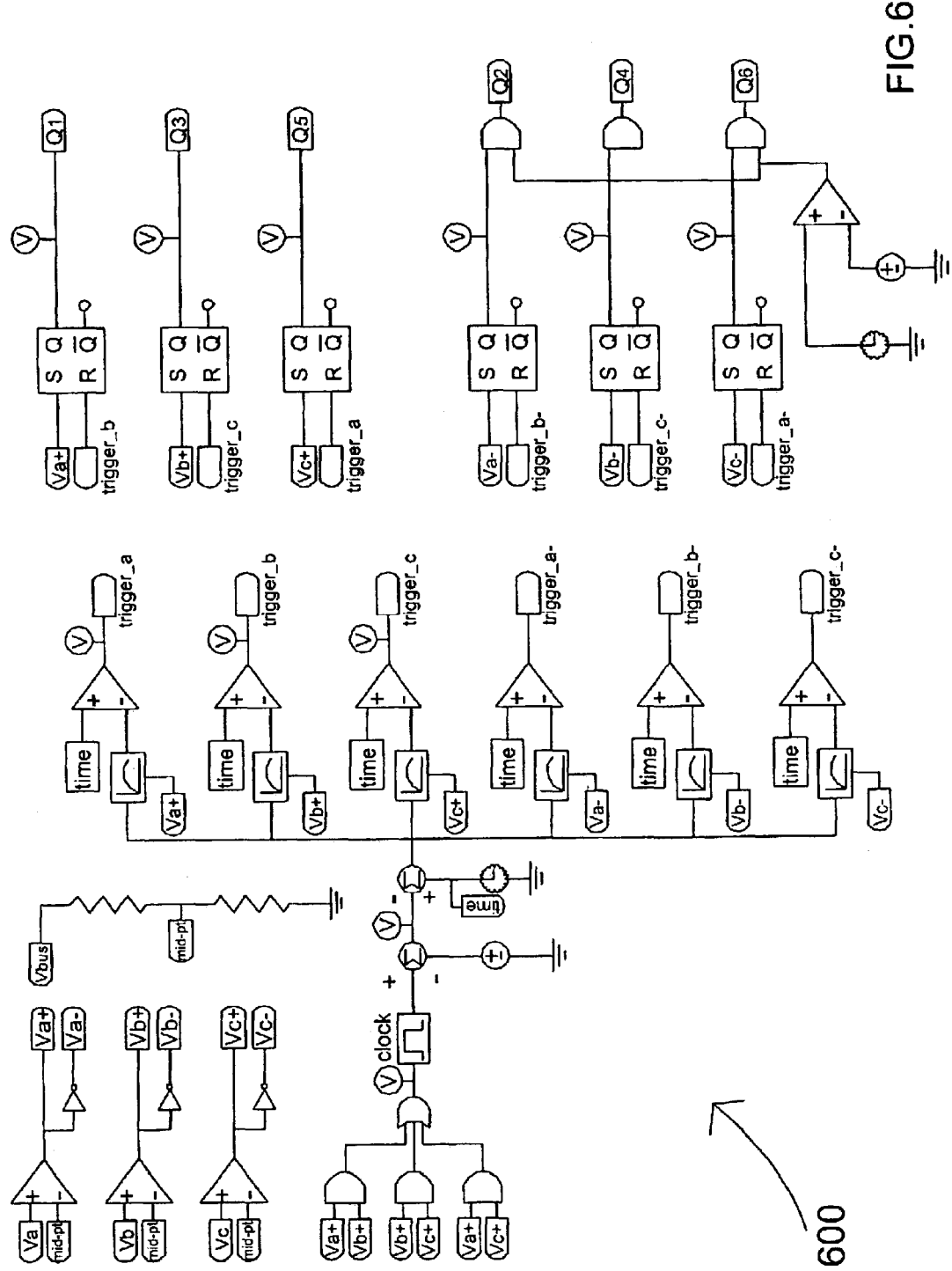
FIG. 6 illustrates a third exemplary control circuit according to the present invention.

Referring now to FIG. 6, there is seen another exemplary control circuit 600 according to the present invention for rectifying a 3-phase sinusoidal AC source 125 having an inductance. Control circuit 600 is operable to turn on gate signals Q1, Q2, Q3, Q4, Q5, Q6, based solely on phase voltage values. Specifically, when the phase voltage exceeds (resp. falls below) a fixed value, the high side (resp. low side) body diode conducts and therefore the high side (resp. low side) MOSFET can be turned on.

The control circuit 600 of FIG. 6 performs MOSFET turn-off in diode mode by keeping gate signals Q1, Q2, Q3, Q4, Q5, Q6 turned off, and by estimating the period of the 3-phase sinusoidal AC source 125. Diode rectification may last, for example, 1.5 ms. With the period information, the MOSFET gate driver can estimate the turn-off commutation times. A delay, for example, 100 us, may be provided, so that the actual turn-off of gate signals Q1, Q2, Q3, Q4, Q5, Q6 occurs before the end of the period, thereby causing the body diode of the MOSFET to conduct for the duration of the delay. However, the delay should be large enough to accommodate the largest source period variation. Control circuit 600 may, for example, continuously measure and update the source period information to keep track of the evolution of the 3-phase sinusoidal AC source 125.

It should be appreciated that the delay and diode rectification times may be adjusted in accordance with a particular application.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. A rectifying circuit to produce a DC output by rectifying a sinusoidal source having a plurality of output phase voltages and a plurality of phase-to-phase voltages, the rectifying circuit comprising:

a bridge circuit coupled to the output phase voltages, the bridge circuit having a plurality of switches; and a control circuit coupled to the output phase voltages and to the bridge circuit, the control circuit being configured to control the switches in accordance with respective absolute values of the phase-to-phase voltages; wherein the output phase voltages are rectified to produce the DC output.

2. The rectifying circuit according to claim 1, wherein the absolute values of phase-to-phase voltages are determined in accordance with the output phase voltages.

3. The rectifying circuit according to claim 2, wherein the output phase voltages include a $V_A$ output phase voltage, a $V_B$ output phase voltage, and a $V_C$ output phase voltage.

4. A rectifying circuit to produce a DC output by rectifying a sinusoidal source having a plurality of output phase voltages and a plurality of phase-to-phase voltages, the rectifying circuit comprising:

a bridge circuit coupled to the output chase voltages, the bridge circuit having a plurality of switches; and a control circuit coupled to the output phase voltages and to the bridle circuit, the control circuit being configured to control the switches in accordance with respective absolute values of the phase-to-phase voltages; wherein the output phase voltages are rectified to produce the DC output, wherein the absolute values of phase-to-phase, voltages are determined in accordance with the output phase voltages, the output phase voltages include a $V_A$ output phase voltage, a $V_B$ output phase voltage, and a $V_C$ output phase voltage, and the phase-to-phase voltages include a $V_{AB}$ phase-to-phase voltage, a $V_{BC}$ phase-to-phase voltage, and a $V_{CA}$ phase-to-phase voltage, the phase-to-phase voltages being determined in accordance with the following equations:

$$V_{AB}=V_A-V_B$$

$$V_{BC}=V_B-V_C$$

$$V_{CA}=V_C-V_A.$$

5. The rectifying circuit according to claim 4, further comprising:

a DC output bus to provide the DC output; and a return bus coupled to the sinusoidal source; wherein the switches of the bridge circuit include a first pair of switches coupled via a first node, a second pair of switches coupled via a second node, and a third pair of switches coupled via a third node, the $V_A$ output phase voltage, the $V_B$ output phase voltage, and the $V_C$ output phase voltage being coupled to the first node, the second node, and the third node, respectively, one of the switches of each pair of switches being coupled to the DC output bus, and another one of the switches of each pair of switches being coupled to the return bus.

6. The rectifying circuit according to claim 5, wherein the first pair of switches includes a first switch and a second switch, the second pair of switches includes a third switch and a fourth switch, the third pair of switches including a fifth switch and a sixth switch, the first, third, and fifth switches being coupled to the DC bus, the second, fourth, and sixth switches being coupled to the return bus, the control circuit being configured to:

a. turn on the first and fourth switches when the absolute value of $V_{AB}$ is greater than the absolute values of $V_{BC}$ and $V_{CA}$ and a magnitude of $V_{AB}$ is greater than zero;

b. turn on the second and third switches when the absolute value of $V_{AB}$ is greater than the absolute values of $V_{BC}$ and $V_{CA}$ and the magnitude of $V_{AB}$ is less than zero;

c. turn on the third and sixth switches when the absolute value of $V_{BC}$ is greater than the absolute values of $V_{AB}$ and $V_{CA}$ and the magnitude of $V_{BC}$ is greater than zero;

d. turn on the third and sixth switches when the absolute value of $V_{BC}$ is greater than the absolute values of $V_{AB}$ and $V_{CA}$ and the magnitude of $V_{BC}$ is less than zero;

e. turn on the second and fifth switches when the absolute value of $V_{CA}$ is greater than the absolute values of $V_{AB}$ and $V_{BC}$, and the magnitude of $V_{CA}$ is greater than zero; and f. turn on the second and fifth switches when the absolute value of $V_{CA}$ is greater than the absolute values of $V_{AB}$ and $V_{BC}$, and the magnitude of $V_{CA}$ is less than zero.

7. The rectifying circuit according to claim 6, wherein the plurality of switches include at least one of a plurality of MOSFETs and a plurality of IGBTs.

8. The rectifying circuit according to claim 6, wherein the control circuit is configured to control the gate nodes when at least one of $V_A$, $V_B$, and $V_C$ is greater than the DC output.

9. The rectifying circuit according to claim 4, wherein the control circuit includes respective logic comparators configured to produce respective logic signals in accordance with the respective absolute values of a plurality of phase-to-phase voltages.

10. The rectifying circuit according to claim 9, further comprising:

a DC output bus to provide the DC output; and a return bus coupled to the sinusoidal source; wherein the switches of the bridge circuit include a first pair of switches coupled via a first node, a second pair of switches coupled via a second node, and a third pair of switches coupled via a third node, the $V_A$ output phase voltage, the $V_B$ output phase voltage, and the $V_C$ output phase voltage being coupled to the first node, the second node, and the third node, respectively, one of the switches of each pair of switches being coupled to the DC output bus, and another one of the switches of each pair of switches being coupled to the return bus.

11. The rectifying circuit according to claim 10, wherein the first pair of switches includes a first switch and a second switch, the second pair of switches includes a third switch and a fourth switch, the third pair of switches including a fifth switch and a sixth switch, the first, third, and fifth switches being coupled to the DC bus, the second, fourth, and sixth switches being coupled to the return bus, the control circuit being configured to:

a. turn on the first and fourth switches when the absolute value of $V_{AB}$ is greater than the absolute values of $V_{BC}$ and $V_{CA}$ and a magnitude of $V_{AB}$ is greater than zero;

b. turn on the second and third switches when the absolute value of $V_{AB}$ is greater than the absolute values of $V_{BC}$ and $V_{CA}$ and the magnitude of $V_{AB}$ is less than zero;

c. turn on the third and sixth switches when the absolute value of $V_{BC}$ is greater than the absolute values of $V_{AB}$ and $V_{CA}$ and the magnitude of $V_{BC}$ is greater than zero;

d. turn on the third and sixth switches when the absolute value of $V_{Bc}$ is greater than the absolute values of $V_{AB}$ and $V_{CA}$ and the magnitude of $V_{BC}$ is less than zero;

e. turn on the second and fifth switches when the absolute value of $V_{CA}$ is greater than the absolute values of $V_{AB}$ and $V_{BC}$, and the magnitude of $V_{CA}$ is greater than zero; and f. turn on the second and fifth switches when the absolute value of $V_{CA}$ is greater than the absolute values of $V_{AB}$ and $V_{BC}$, and the magnitude of $V_{CA}$ is less than zero.

12. A rectifying circuit to produce a DC output by rectifying a sinusoidal source having a plurality of output phase voltages and a plurality of phase-to-phase voltages, the rectifying circuit comprising:

a bridge circuit coupled to the output phase voltages, the bridge circuit having a plurality of switches; and a control circuit coupled to the output phase voltages and to the bridge circuit, the control circuit being configured to control the switches in accordance with the phase-to-phase voltages; wherein the output phase voltages are rectified to produce the DC output.

13. A rectifying circuit to produce a DC output by rectifying a sinusoidal source having a plurality of output phase voltages and a plurality of phase-to-phase voltages, the rectifying circuit comprising:

a bridge circuit coupled to the output phase voltages, the bridge circuit having a plurality of switches; and a control circuit coupled to the output chase voltages and to the bridge circuit, the control circuit being configured to control the switches in accordance with the phase-to-phase voltages; wherein the output phase voltages are rectified to produce the DC output, wherein the control circuit estimates a period of the sinusoidal source.

14. The rectifying circuit according to claim 13, wherein the control circuit is configured to account for variations in the period of the sinusoidal source.

15. The rectifying circuit according to claim 13, wherein the control circuit is configured to measure and update information in accordance with the period of the sinusoidal source.

16. The rectifying circuit according to claim 13, wherein the control circuit is configured to provide a delay, turn-off times of the gate nodes being determined in accordance with the delay.

17. The rectifying circuit according to claim 16, wherein the delay is 100 us.

18. A method of producing a DC output by rectifying a sinusoidal source having a plurality of output phase voltages and a plurality of phase-to-phase voltages using a plurality of MOSFETS having respective gate nodes, the method comprising:

providing a bridge circuit coupled to the output phase voltages, the bridge circuit having a plurality of switches; and controlling the switches of the bridge circuit in accordance with respective absolute values of the phase-to-phase voltages; wherein the output phase voltages are rectified to produce the DC output.

19. The method according to claim 18, further comprising: determining the absolute values of phase-to-phase voltages in accordance with the output phase voltages.

20. The method according to claim 19, wherein the output phase voltages include a $V_A$ output phase voltage, a $V_B$ output phase voltage, and a $V_C$ output phase voltage.

21. A method of producing a DC output by rectifying a sinusoidal source having a plurality of output phase voltages and a plurality of phase-to-phase voltages using a plurality of MOSFETS having respective gate nodes, the method comprising:

providing a bridge circuit coupled to the output phase voltages, the bridge circuit having a plurality of switches;

controlling the switches of the bridge circuit in accordance with respective absolute values of the phase-to-phase voltages; wherein the output phase voltages are rectified to produce the DC output; and determining the absolute values of phase-to-phase voltages in accordance with the output phase voltages, wherein the output phase voltages include a $V_A$ output phase voltage, a $V_B$ output phase voltage, and a $V_C$ output phase voltage, and the phase-to-phase voltages include a $V_{AB}$ phase-to-phase voltage, a $V_{BC}$ phase-to-phase voltage, and a $V_{CA}$ phase-to-phase voltage, the phase-to-phase voltages being determined in accordance with the following equations:

$$V_{AB} = V_A - V_B$$

$$V_{BC} = V_B - V_C$$

$$V_{CA} = V_C - V_A.$$

22. The method according to claim 21, further comprising:

providing a DC bus and a return bus; wherein the switches of the bridge circuit include a first pair of switches coupled via a first node, a second pair of switches coupled via a second node, and a third pair of switches coupled via a third node, the $V_A$ output phase voltage, the $V_B$ output phase voltage, and the $V_C$ output phase voltage being coupled to the first node, the second node, and the third node, respectively, one of the switches of each pair of switches being coupled to the DC output bus, and another one of the switches of each pair of switches being coupled to the return bus.

23. The method according to claim 22, wherein the first pair of switches includes a first switch and a second switch, the second pair of switches includes a third switch and a fourth switch, the third pair of switches including a fifth switch and a sixth switch, the first, third, and fifth switches being coupled to the DC bus, the second, fourth, and sixth switches being coupled to the return bus, the control circuit being configured to:

a. turn on the first and fourth switches when the absolute value of $V_{AB}$ is greater than the absolute values of $V_{BC}$ and $V_{CA}$ and a magnitude of $V_{AB}$ is greater than zero;

b. turn on the second and third switches when the absolute value of $V_{AB}$ is greater than the absolute values of $V_{BC}$ and $V_{CA}$ and the magnitude of $V_{AB}$ is less than zero;

c. turn on the third and sixth switches when the absolute value of $V_{BC}$ is greater than the absolute values of $V_{AB}$ and $V_{CA}$ and the magnitude of $V_{BC}$ is greater than zero;

d. turn on the third and sixth switches when the absolute value of $V_{BC}$ is greater than the absolute values of $V_{AB}$ and $V_{CA}$ and the magnitude of $V_{BC}$ is less than zero;

e. turn on the second and fifth switches when the absolute value of $V_{CA}$ is greater than the absolute values of $V_{AB}$ and $V_{BC}$, and the magnitude of $V_{CA}$ is greater than zero; and f. turn on the second and fifth switches when the absolute value of $V_{CA}$ is greater than the absolute values of $V_{AB}$ and $V_{BC}$, and the magnitude of $V_{CA}$ is less than zero.

24. The method according to claim 23, wherein the plurality of switches include at least one of a plurality of MOSFETs and a plurality of IGBTs.

25. The method according to claim 23, wherein the control circuit is configured to control the gate nodes when at least one of $V_A$, $V_B$, and $V_C$ is greater than the DC output.

* * * * *